United States Patent [19]

Rudnev et al.

[11] Patent Number: 4,751,860
[45] Date of Patent: Jun. 21, 1988

[54] METHOD OF MAKING BLANKING DIE SETS

[75] Inventors: Ivan E. Rudnev; Viktor V. Kulikov, both of Tolyatti, U.S.S.R.

[73] Assignee: Volzhskoe Obiedinenie Po Proizvodstvu Legkovykh Avtomobilei, Tolyatti, U.S.S.R.

[21] Appl. No.: 903,577

[22] PCT Filed: Aug. 1, 1986

[86] PCT No.: PCT/SU85/00026

§ 371 Date: Aug. 1, 1986

§ 102(e) Date: Aug. 1, 1986

[87] PCT Pub. No. WO 86/05732

PCT Pub. Date: Oct. 9, 1986

[51] Int. Cl.⁴ .................... B23H 9/12; B21D 37/20
[52] U.S. Cl. ..................... 76/107 R; 219/121 EM
[58] Field of Search .................... 76/107 R, 101 R; 219/121 EM, 121 ER, 121 ET

[56] References Cited

FOREIGN PATENT DOCUMENTS 1483734 8/1977 United Kingdom ............. 76/107 R

OTHER PUBLICATIONS

V. S. Mendelson et al, "Manufacture of Dies and Moulds", 1982, Mashinostroenie, Publishers (Moscow), p. 78.

B. A. Artamonov et al, "Electromachining of Metals to Correct Size", 1978, Vysshaya Shkola Publishers, (Moscow), p. 132 and pp. 160–162.

V. M. Vladimirov, "Manufacture of Die Sets, Press Moulds and Fixtures", Vysshaya Shkola Publishers, 1981, pp. 180–201.

*Primary Examiner*—Roscoe V. Parker
*Attorney, Agent, or Firm*—Fleit, Jacobson, Cohn & Price

[57] ABSTRACT

The method of making blanking die sets provides for preparing a stack of blanks of a predetermined profile for use as positive tool electrodes. The working parts of blanking die sets are subjected to prior machining. Production holes are provided in positive tool electrodes, after which using one of the positive tool electrodes, the working parts of the die set are marked off, dimensions of the working profile of the tool electrode are reduced either mechanically or chemically, and the female die and the stripper are subjected to rough electrical discharge machining. The second positive tool electrode is used for finish electrical discharge machining of the female die and the stripper. The third positive tool electrode is used for burning through a stack of negative tool electrodes wherein production holes are provided. The negative tool electrodes are used for rough and finish machining of the male die and the knock-out.

1 Claim, 2 Drawing Sheets

METHOD OF MAKING BLANKING DIE SETS

TECHNICAL FIELD

The present invention relates to electrophysical machining, and more particularly it relates to a method of making blanking die sets.

PRIOR ART

The main goals involved in die set production are reduced labor consumption, inchangeability of working components of a die set in repairs without making resort to hand fitting, and a shorter die set production cycle.

There is known a method of making blanking die sets (cf. Textbook "Manufacture of Die Sets, Press Moulds and Fixtures, by V. M. Vladimirov, Moscow, Yysshaya Shkola Publishers, 1981, pp. 180–201) wherein a female die is made first. Subsequently, an impression is made on a male die and a knock-out with the hardened and finished female die. The male die and the knock-out are finished by virtue of hand fitting. A stripper with an impression made with the male die is brought up to size by hand fitting as well.

The female die-making process involves planing of a blank to size within a specified allowance, grinding of the lower and upper surfaces, grinding of the two lateral surfaces, drilling and enlargement of holes, marking-out of the hole contour, milling of the hole with an allowance for subsequent benchwork, hand fitting the hole along its profile prior to hardening, hardening followed by tempering, grinding of the lower and upper surfaces, and hand finishing of the hole along its contour using abrasive or diamond tools.

The male die- and knock-out-making process is as follows. The male die and the knock-out are first machined along their contours as per marking-out. An impression is made with the hardened and finished female die. The male die and the knock-out are hand cast with reference to said impression. Thereafter, they are hardened and tempered. Finally, the male die and the knock-out are hand finished along their working contours by virtue of abrasive or diamond tools.

The stripper-making process involves machining along its contour as per marking-out. Thereafter, an impression is made with the hardened and finished male die, and a hole is filed along its contour with smooth files with reference to said impression.

The aforesaid method indicates that hand fitting accounts for most complicated and important operations. Female and male dies, strippers, and knock-outs are marked off, filed prior to hardening, and finally brought up to size by virtue of hand fitting. Hand working of die set components fails to ensure high labor productivity. The low machining accuracy of the working contours of female and male dies, strippers, and knock-outs makes it impossible to manufacture precision die sets for accurate finish blanking. Said method fails to provide interchangeability of the working parts of a die set in repairs with no hand fitting required.

There is also known a method of making blanking die sets using electrical discharge maching (cf. e.g. Textbook "Dimensional Electrical Discharge Machining of Metals" by B. A. Artomonov, A. L. Vishnitsky, Yu. S. Volkov, A. V. Glazkov, Moscow, Vysshaya Shkola Publishers, 1978, pp. 160–162) wherein a female die is made with a wire electrode as per template in an electrical-discharge machine. The same method is employed for making a stack of plate tool electrodes which are used for processing a male die in an electrical-discharge piercing machine.

The female-die-making process involves milling or planing of a blank to size within a specified allowance, grinding of the lower and upper surfaces, grinding of the two lateral surfaces, drilling and enlargement of holes, hardening followed by tempering, cutting of a hole as per hand-made template using a wire electrode, and hand finishing of the hole along its contour using abrasive or diamond tools.

The male die-making process involves milling or planing of a blank to size within a specified allowance, grinding of the lower, upper, and two lateral surfaces, drilling and enlargement of holes, hardening followed by tempering, grinding of the lower and upper surfaces, electrical discharge machining of the male die along its working contour with plate tool electrodes, said electrodes being made with a wire tool electrode as per template, and hand finishing of the male die along its contour using abrasive or diamond tools.

The aforesaid method indicates that a female die is manufactured as per hand-made template using a wire tool electrode. For processing a male die, use is made of plate tool electrodes made like a female die as per template. Hand making of templates and hand fitting following electrical discharge machining fail to ensure high labour productivity. The low machining accuracy of the working contours of female and male dies makes it impossible to manufacture precision die sets for accurate finishing blanking. Said method fails to provide interchangeability of the working parts of a die set in repairs with no hand fitting required.

SUMMARY OF THE INVENTION

It is an object of the present invention to provide a method of making blanking die sets which makes it possible to enhance machining accuracy of working parts, reduce labor consumption, and ensure interchangeability of new working parts in repairs, the technology of their manufacture being updated.

The object is attained by a method of making blanking die sets according to which a stack of blanks of a predetermined profile is prepared for use as tool electrodes for electrical discharge machining of components of blanking die sets, said components being machined to a profile similar to the one specified in the present invention, whereupon a stack of positive tool electrodes is prepared and production holes are provided in each of them, wherein after using one of the positive tool electrodes, the working parts of a die set are marked off, dimensions of the working profile of said tool electrode are decreased either mechanically or chemically, and a female die and a stripper are rough-machined. A second positive tool electrode is used for finish electrical discharge machining of the female die and the stripper, and a third positive tool electrode is used for burning through a stack of negative tool electrodes whereby production holes are provided. The negative tool electrodes are thereafter used for rough and finish machining of a male die and a knock-out.

The herein-disclosed method of making blanking die sets provides for:

reduced labor consumption (by 1.3 times) in making die sets due to a high machining accuracy of female and male dies, a stripper, and a knock-out using electrical discharge machining by virture of tool electrodes;

interchangeability of the working parts in a die set, thus eliminating the need for hand fitting of female and male dies, strippers, and knock-outs along their profiles, labor consumption in repairing die sets being reduced 1.2 times.

BRIEF DESCRIPTION OF THE DRAWINGS

The present invention is illustrated hereinbelow by the description of examples with reference to the accompanying drawings, wherein.

DETAILED DESCRIPTION OF THE DRAWINGS

The method of making blanking die sets, in accordance with the present invention, is as follows.

Figure 1:
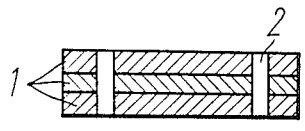
FIG. 1 illustrates a stack of positive tool electrodes.

A stack of copper or other current-conducting plates 1 (FIG. 1) is prepared. Production holes 2 (FIGS. 1, 2) are provided and a profile of positive tool electrodes 3 (FIG. 2) is cut with a wire tool electrode in a N/C electrical-discharge machine.

Figure 5:
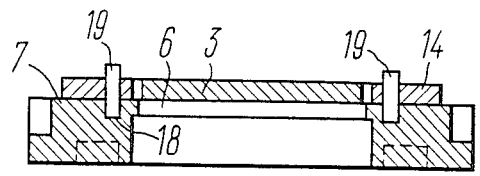
FIG. 5 is a sectional view of a stripper with a pin-locked negative tool electrode and a positive tool electrode, the negative tool electrode serving as an adjuster gauge.
Figure 6:
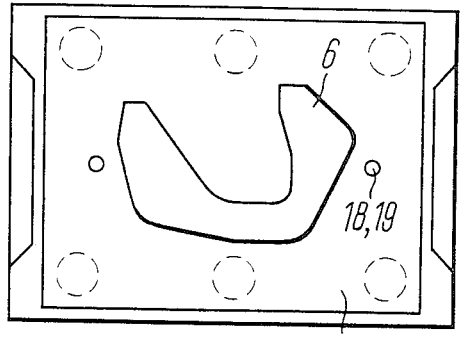
FIG. 6 is a plan view of a stripper.
Figure 2:
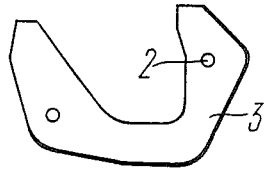
FIG. 2 is a view of the contour of a positive tool electrode.
Figure 3:
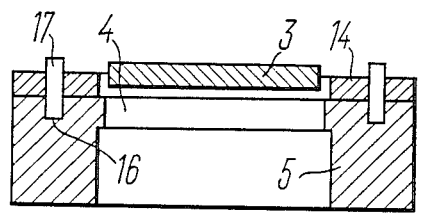
FIG. 3 is a sectional view of a female die with a pin-locked negative tool electrode and a positive tool electrode, the negative tool electrode serving as an adjuster gauge.
Figure 7:
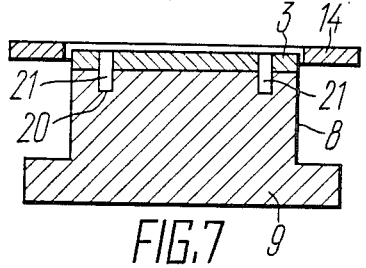
FIG. 7 is a sectional view of a male die with a pin-locked positive tool electrode and a negative tool electrode, the positive tool electrode serving as an adjuster gauge.
Figure 4:
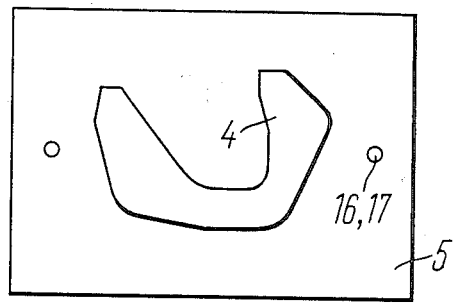
FIG. 4 is a plan view of a female die.
Figure 9:
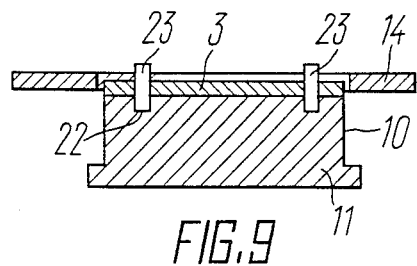
FIG. 9 is a sectional view of a knock-out with a pin-locked positive tool electrode and a negative tool electrode, the positive tool electrode serving as an adjuster gauge.
Figure 10:
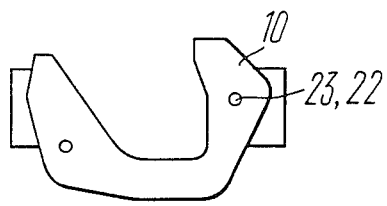
FIG. 10 is a plan view of a knock-out.
Figure 11:
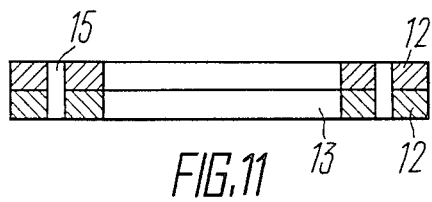
FIG. 11 illustrates a stack of negative tool electrodes.

Working holes 4 of a female die 5 (FIGS. 3, 4), working holes 6 of a stripper 7 (FIGS. 5, 6), a working profile 8 of the male die 9 (FIGS. 7, 9), and a working profile 10 of a knock-out II (FIGS. 9, 10) are marked off using one of the three positive tool electrodes 3 (FIG. 2). Dimensions of the working profile of the tool electrode 3 (FIGS. 2, 3) are decreased either mechanically or chemically, said tool electrode being used for rough machining of the working hole 4 (FIGS. 3, 4) of the female die 5 and the working hole 6 (FIGS. 5, 6) of the stripper 7 in an electrical-discharge piercing machine.

A second positive tool electrode 3 (FIG. 2) is used for finish electrical discharge machining of the working hole 4 (FIGS. 3, 4) of the female die 5 and the working hole 6 (FIGS. 5, 6) of the stripper 7.

Figure 12:
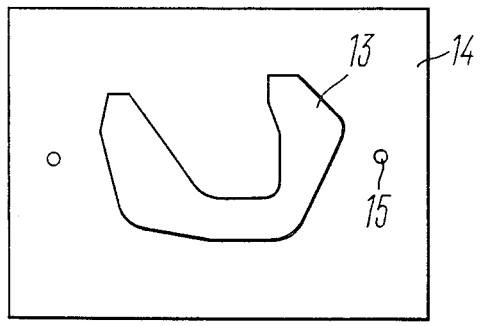
FIG. 12 is view of the contour of a negative tool electrode.

A third positive tool electrode 3 (FIG. 2) is used for burning through a stack (FIG. II) of copper or other current-conducting plates 12 (FIG. II) to provide a working hole 13 (FIGS. II, 12) and preparing negative tool electrodes 14 (FIG. 12) in an electrical-discharge machine. Production holes 15 are enlarged in the negative tool electrodes 14.

The manufacture of the female die 5 (FIGS. 3, 4) involves the following operations. A blank is milled to size within a specified allowance. The lower, upper, and two lateral surfaces of the female die 5 are ground. Holes are drilled and enlarged as per drawing, including production holes 16 on the female die 5. The working hole 4 contour is marked out. The working hole 4 is milled with an allowance provided for electrical discharge machining. The female die 5 is hardened and tempered. The lower and upper surfaces of the female die 5 are ground. Production holes 16 are subjected to jig grinding. The electrical discharge machining of the working hole 4 of the female die 5 (FIGS. 3, 4) is carried out as follows. The negative tool electrode 14 is fixed on the female die 5 (FIG. 3) and locked by virtue of cylindrical pins 17. This being the case, the negative tool electrode 14 serves as an adjuster gauge for the positive tool electrode 3, the latter being used for burning through the working hole 4 of the female die 5.

The manufacture of the stripper 7 (FIGS. 5, 6) involves the following operations. A blank is milled to size within a specific allowance. The lower, upper, and two lateral surfaces of the stripper 7 are ground. Holes are drilled and enlarged as per drawing, including production holes 18 on the stripper 7. The working hole 6 contour is marked out. The working hole 6 is milled with an allowance provided for electrical discharge machining. The electrical discharge machining of the working hole 6 of the stripper 7 (FIGS. 5, 6) is carried out as follows. A negative tool electrode 14 is fixed on the stripper 7 (FIG. 5) and locked by virtue of cylindrical pins 19. This being the case, the negative tool electrode 14 serves as an adjuster gauge for the positive tool electrode 3, the latter being used for burning through the working hole 6 of the stripper 7.

Figure 8:
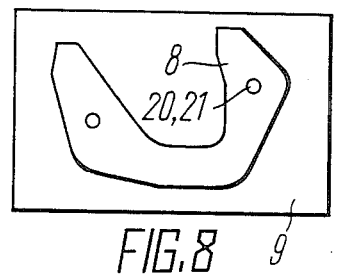
FIG. 8 is a plan view of a male die.

The manufacture of the male die 9 (FIGS. 7, 8) involves the following operations. A blank is milled to size within a specified allowance. The lower, upper, and lateral surfaces of the male die 9 are ground. Holes are drilled and enlarged as per drawing, including production holes 20 on the male die 9. The working profile 8 of the male die 9 is marked out. The male die 9 is milled along its working profile 8 with an allowance provided for electrical discharge machining. The male die 9 is hardened and tempered. The lower and upper surfaces of the male die 9 are ground. Production holes 20 are subjected to jig grinding. The electrical discharge machining of the male die 9 (FIGS. 7, 8) along its working profile 8 is carried out as follows. A positive tool electrode 3 is fixed on the male die 9 (FIG. 7) and locked by virtue of cylindrical pins 21. This being the case, the positive tool electrode 3 serves as an adjuster gauge for the negative tool electrode 14, the latter being used for burning through the working profile 8 of the male die 9.

The manufacture of the knock-out II (FIGS. 9, 10) involves the following operations. A blank is milled to size within a specified allowance. The lower, upper, and lateral surfaces of the knock-out II are ground. Holes are drilled and enlarged as per drawing, including production holes 22 on the knock-out II. The working profile 10 of the knock-out II is marked out. The knock-out II is milled along its working profile 10 with an allowance provided for electrical discharge machining. The knock-out II is hardened and tempered. The lower and upper surfaces of the knock-out II are ground. Production holes 22 are subjected to jig grinding. The electrical discharge machining of the knock-out II (FIGS. 9, 10) along its working profile 10 is carried out as follows. A positive tool electrode 3 is fixed on the knock-out II (FIG. 9) and locked by virtue of cylindrical pins 23. This being the case, the positive tool electrode 3 serves as an adjuster gauge for the negative tool electrode 14, the latter being used for burning through the working profile 10 of the knock-out II.

The labor consumption in making blanking die sets is hence reduced 1.3 times as a result of preparing a set of blanks of a predetermined profile to be used as positive and negative tool electrodes in machining of female and male dies, strippers, and knock-outs. Production holes provided in positive and negative tool electrodes, female and male dies, a stripper, and a knock-out ensure that identical working parts are produced, thus making them interchangeable, no hand fitting being required. As a result, the labor consumption in repairing blanking die sets can be reduced 1.2 times.

The present invention may be used in making working parts, such as female and male dies, a stripper, and a knock-out in blanking die sets.

What is claimed is:

1. A method of making blanking die sets, comprising the steps of:
    assembling electrically conductive plates into a stack;
    preparing a stack of parts of a desired profile with production holes to obtain positive electrode tools;
    manufacturing working parts of the blanking die set in advance with allowance for electrical discharge machining, wherein the first of said positive electrode tools is used to mark off said working parts of said die set;
    reducing the dimensions of the working profile of said first positive electrode tool by mechanical or chemical means, and rough-machining a female die and stripper of said blanking die set;
    using a second of said positive electrode tools for finish electrical discharge machining of said female die and stripper; and
    using the third of said positive electrode tools to burn through a stack of negative electrode tools, in which production holes are provided, wherein said negative electrode tools are used thereafter for rough and finish machining of the male die and knock-out of said blanking die set.

* * * * *